US012014851B2

(12) United States Patent
Chen et al.

(10) Patent No.: US 12,014,851 B2
(45) Date of Patent: Jun. 18, 2024

(54) INTEGRATED OVER-CURRENT PROTECTION DEVICE

(71) Applicant: FUZETEC TECHNOLOGY CO., LTD., New Taipei (TW)

(72) Inventors: Jack Jih-Sang Chen, New Taipei (TW); Chang-Hung Jiang, New Taipei (TW); Ching-Chiang Yeh, New Taipei (TW); Ming-Chun Lee, New Taipei (TW)

(73) Assignee: FUZETEC TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/967,804

(22) Filed: Oct. 17, 2022

(65) Prior Publication Data

US 2024/0127987 A1 Apr. 18, 2024

(51) Int. Cl.
*H01C 7/02* (2006.01)
*H01C 1/14* (2006.01)

(52) U.S. Cl.
CPC ............. *H01C 7/02* (2013.01); *H01C 1/1406* (2013.01)

(58) Field of Classification Search
CPC ................................ H01C 7/02; H01C 1/1406
See application file for complete search history.

(56) References Cited

U.S. PATENT DOCUMENTS

| | | | | | |
|---|---|---|---|---|---|
| 5,852,397 | A * | 12/1998 | Chan | H01C 17/06586 | 338/312 |
| 6,377,467 | B1 * | 4/2002 | Chu | H01C 1/032 | 361/767 |
| 6,809,626 | B2 * | 10/2004 | Chu | H01C 7/02 | 337/167 |
| 7,026,583 | B2 * | 4/2006 | Tu | H01C 7/02 | 219/505 |
| 7,701,322 | B2 * | 4/2010 | Wang | H01C 1/1406 | 338/22 R |
| 8,933,775 | B2 * | 1/2015 | Wang | H01C 7/027 | 338/13 |
| 9,041,507 | B2 * | 5/2015 | Wang | H01C 7/027 | 338/13 |
| 10,950,372 | B2 * | 3/2021 | Zhou | H01C 7/021 | |

* cited by examiner

*Primary Examiner* — Kyung S Lee
(74) *Attorney, Agent, or Firm* — HSML P.C.

(57) ABSTRACT

An integrated over-current protection device includes a positive temperature coefficient (PTC) component, a first conductive unit, a second conductive unit, a first conductive via, and a second conductive via. The PTC component includes a first PTC body, and has opposing first and second surfaces. The first conductive unit is disposed on the first surface, and includes a first electrode and a first conductive pad electrically insulated from the first electrode. The second conductive unit is disposed on the second surface, and includes a second electrode and a second conductive pad electrically insulated from the second electrode. The first conductive via extends through the first conductive unit and the PTC component to electrically connect the first electrode to the second conductive pad. The second conductive via extends through the second conductive unit and the PTC component to electrically connect the second electrode to the first conductive pad.

16 Claims, 7 Drawing Sheets

INTEGRATED OVER-CURRENT PROTECTION DEVICE

FIELD

The disclosure relates to an integrated over-current protection device.

BACKGROUND

A positive temperature coefficient (PTC) component exhibits a PTC effect, which allows the PTC component to provide similar effect as that of an over-current protection device, such as a resettable fuse.

Referring to FIG. 1, a conventional over-current protection device includes a PTC body 91, a first electrode 92 and a second electrode 93 that are respectively disposed on two opposite surfaces of the PTC body 91, a first metal lead 94 connected to the first electrode 92, and a second metal lead 95 connected to the second electrode 93. The PTC body 91 includes a polymer matrix which includes a crystallized region and a non-crystallized region. The PTC body 91 also includes a particulate conductive filler which is dispersed throughout the non-crystallized region of the polymer matrix and which is formed into a continuous conductive path for electrical conduction between the first and second electrodes 92, 93. When the polymer matrix reaches its melting point, crystals within the crystallized region of the polymer matrix start melting to form a new non-crystallized region, which is known as the PTC effect. When the new non-crystallized region becomes larger and merges with the original non-crystallized region, the conductive path becomes discontinuous and resistance of the polymer matrix significantly increases, which results in electrical disconnection between the first and second electrodes 92, 93. Therefore, there is still a need to develop an integrated over-current protection device with improved electrical properties and reliability.

SUMMARY

Therefore, an object of the disclosure is to provide an integrated over-current protection device that can alleviate at least one of the drawbacks of the prior art.

According to the present disclosure, the integrated over-current protection device includes a positive temperature coefficient (PTC) component, a first conductive unit, a second conductive unit, a first conductive via, and a second conductive via. The PTC component includes a first PTC body, and has a first surface and a second surface opposite to the first surface. The first conductive unit includes a first metal layer which is disposed on the first surface, and which includes a first electrode and a first conductive pad electrically insulated from the first electrode. The second conductive unit includes a second metal layer which is disposed on the second surface, and which includes a second electrode and a second conductive pad electrically insulated from the second electrode. The first conductive via extends through the first conductive unit and the PTC component to electrically connect the first electrode to the second conductive pad. The second conductive via extends through the second conductive unit and the PTC component to electrically connect the second electrode to the first conductive pad.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
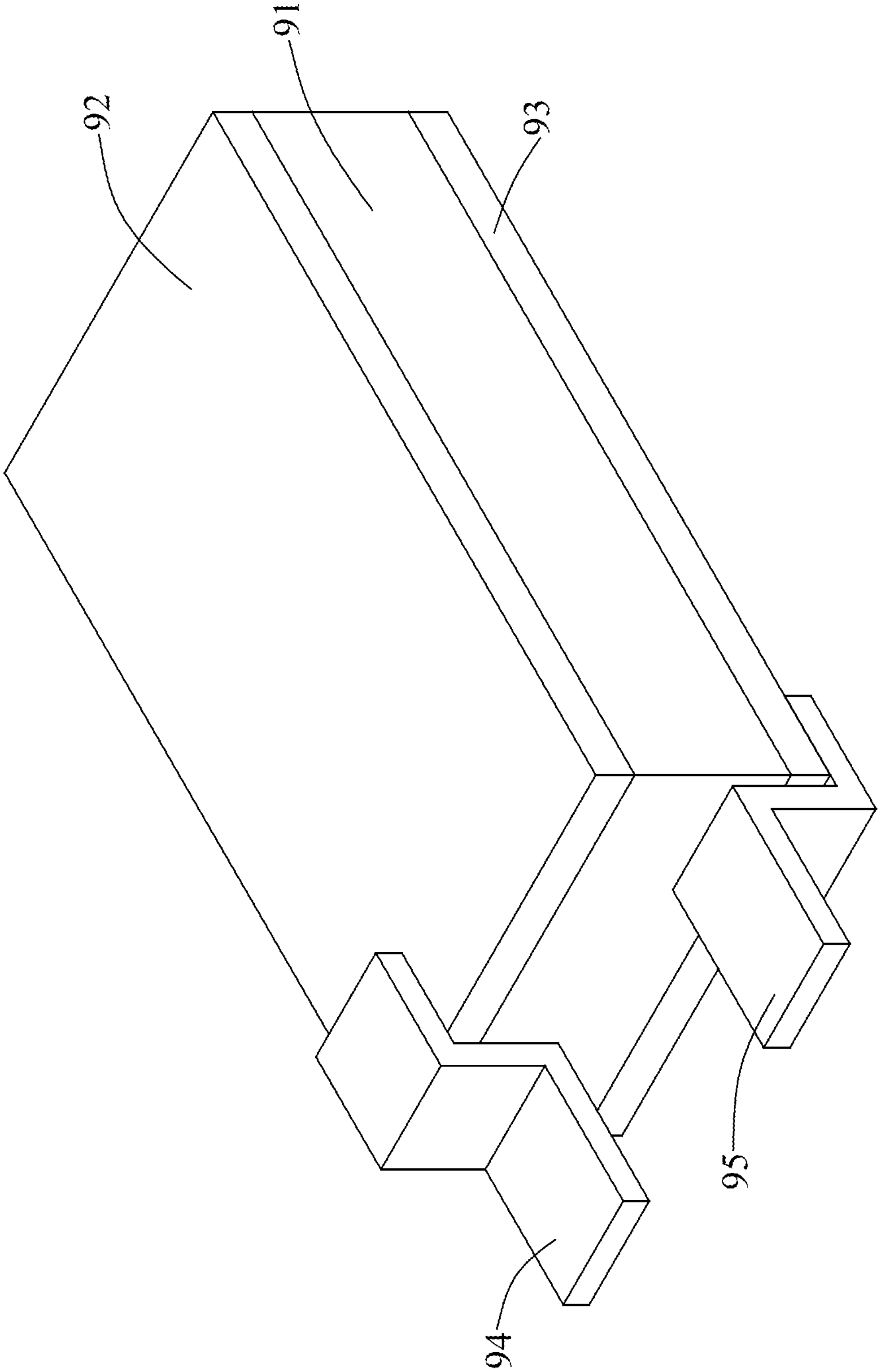
FIG. 1 PRIOR ART
FIG. 1 is a perspective schematic view illustrating a conventional over-current protection device.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
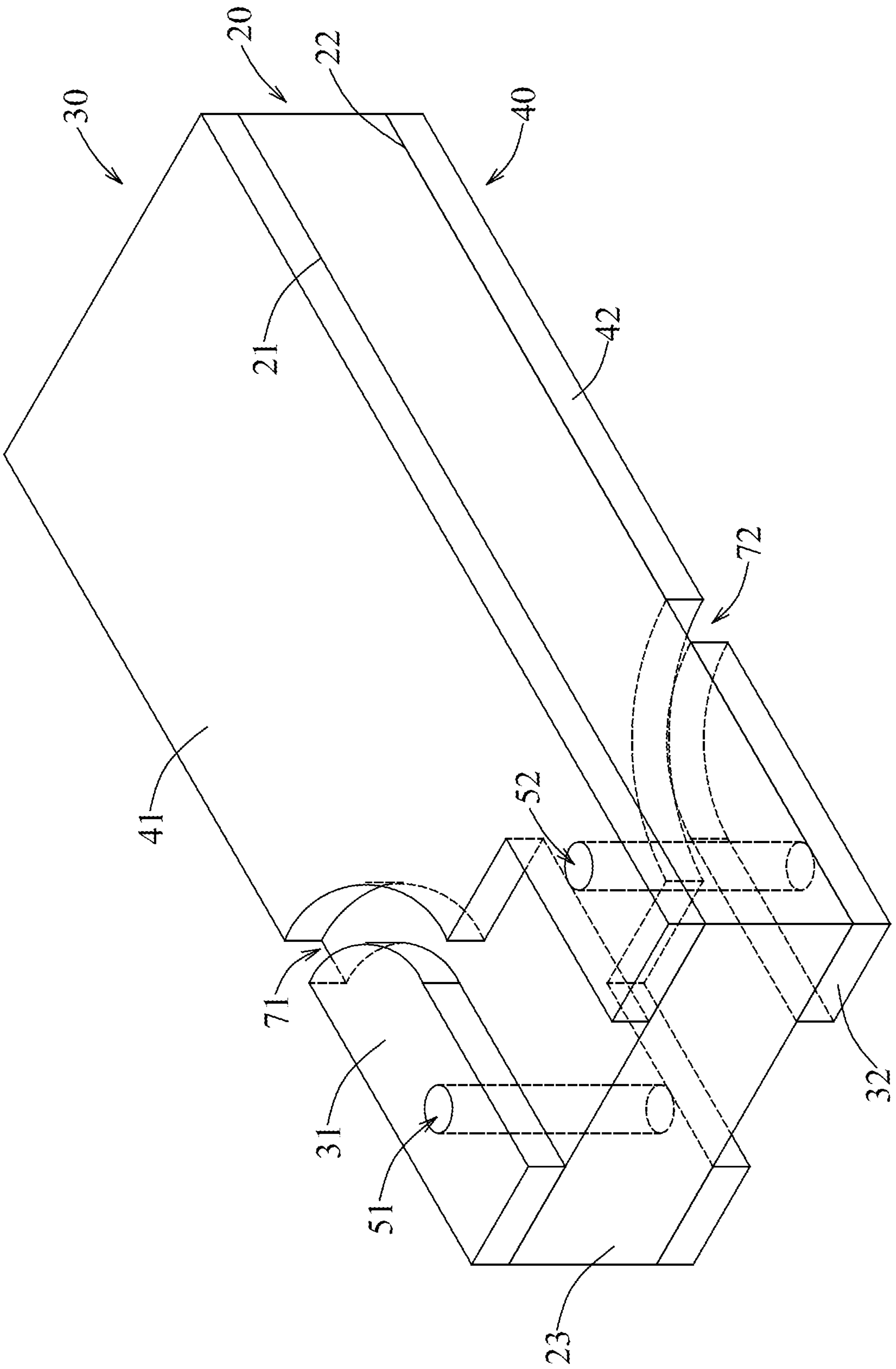
FIG. 2 is a perspective schematic view illustrating a first embodiment of an integrated over-current protection device according to the present disclosure.

Referring to FIG. 2, a first embodiment of an integrated over-current protection device according to the present disclosure includes a positive temperature coefficient (PTC) component 20, a first conductive unit, a second conductive unit, a first conductive via 51, and a second conductive via 52.

The PTC component 20 includes a first PTC body 23, and has a first surface 21 and a second surface 22 opposite to the first surface 21. The first PTC body 23 may be a polymeric PTC layer that includes a polymer matrix and a conductive filler dispersed in the polymer matrix. The polymer matrix is made from a polymer composition that contains a non-grafted olefin-based polymer. In certain embodiments, the non-grafted olefin-based polymer is high density polyethylene (HDPE). In other embodiments, the polymer composition further includes a carboxylic acid anhydride-grafted olefin-based polymer. Examples of the conductive filler may include, but are not limited to, carbon black powder, metal powder, electrically conductive ceramic powder, and combinations thereof.

The first conductive unit includes a first metal layer 30 disposed on the first surface 21 of the PTC component 20. The first metal layer 30 includes a first electrode 31 and a first conductive pad 41 that is electrically insulated from the first electrode 31. In certain embodiments, the first metal layer 30 is formed with a first trench 71 to expose the first surface 21 and to electrically insulate the first electrode 31 from the first conductive pad 41. The first trench 71 may be formed with a predetermined shape according to practical needs using a well-known technique in the art, e.g. an etching process and/or a cutting process. The first metal layer 30 may be a copper foil sheet such as a nickel-plated copper foil sheet.

The second conductive unit includes a second metal layer 40 disposed on the second surface 22 of the PTC component 20. The second metal layer 40 includes a second electrode 32 and a second conductive pad 42 electrically insulated from the second electrode 32. In certain embodiments, the second metal layer 40 is formed with a second trench 72 to expose the second surface 22, and to electrically insulate the second electrode 32 from the second conductive pad 42. The second trench 72 may be formed with a predetermined shape according to practical needs using a well-known technique in the art, e.g. an etching process and/or a cutting process. The second metal layer 40 may be made of a material which is the same as or different from that of the first metal layer 30.

The first conductive via 51 extends through the first conductive unit and the PTC component 20 to electrically connect the first electrode 31 of the first metal layer 30 to the second conductive pad 42 of the second metal layer 40. In certain embodiments, the first conductive via 51 further penetrates into the second conductive unit.

The second conductive via 52 extends through the second conductive unit and the PTC component 20 to electrically connect the second electrode 32 of the second metal layer 40 to the first conductive pad 41 of the first metal layer 30. In certain embodiments, the second conductive via 52 further penetrates into the first conductive unit. In this embodiment, each of the first and second conductive vias 51, 52 extends through both the first and second conductive units as well as the PTC component 20.

The integrated over-current protection device has an upper surface (i.e., a top surface of the first metal layer 30 opposite to the first surface 21), a lower surface (i.e., a bottom surface of the second metal layer 40 opposite to the second surface 22), and side walls interconnecting the upper and lower surfaces. In certain embodiments, at least one of the first and second conductive vias 51, 52 is spaced apart from the side walls of the integrated over-current protection device. That is, one or each of the first and second conductive vias 51, 52 is not exposed from the side walls of the integrated over-current protection device.

Figure 3:
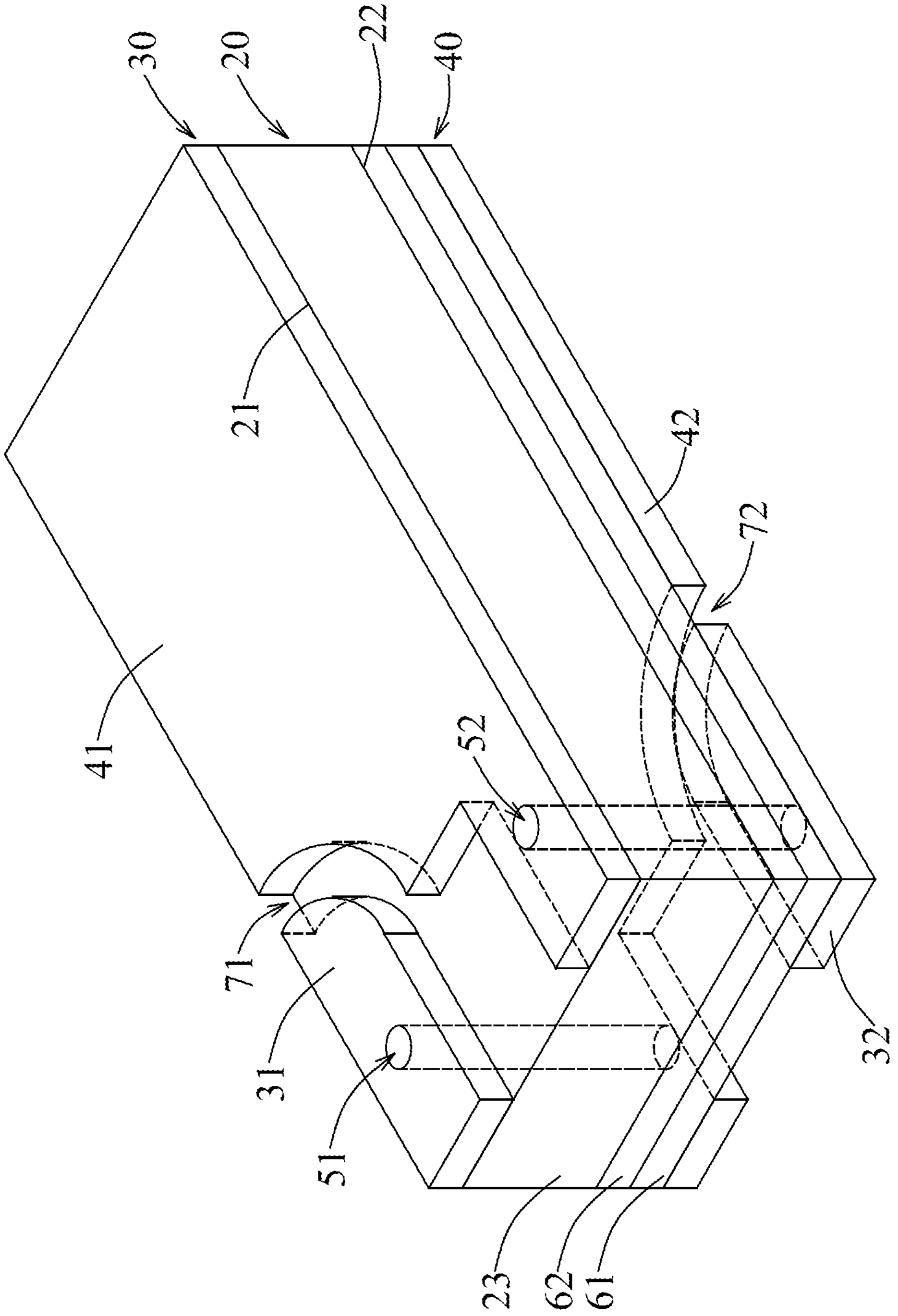
FIG. 3 is a perspective schematic view illustrating a second embodiment of the integrated over-current protection device according to the present disclosure.

Referring to FIG. 3, a second embodiment of the integrated over-current protection device according to the present disclosure is generally similar to the first embodiment, except that, in the second embodiment, the second conductive unit further includes a first insulating layer 61 and a third metal layer 62. The first insulating layer 61 is disposed between the PTC component 20 and the second metal layer 40, and is partially exposed from the second metal layer 40 through the second trench 72. The third metal layer 62 is disposed between the PTC component 20 and the first insulating layer 61. The first conductive via 51 further extends through the first insulating layer 61 and the third metal layer 62. The third metal layer 62 may be made of a material which is the same as or different from that of the first metal layer 30. The first insulating layer 61 may be made of an electrically insulting material, such as epoxy resin.

Figure 4:
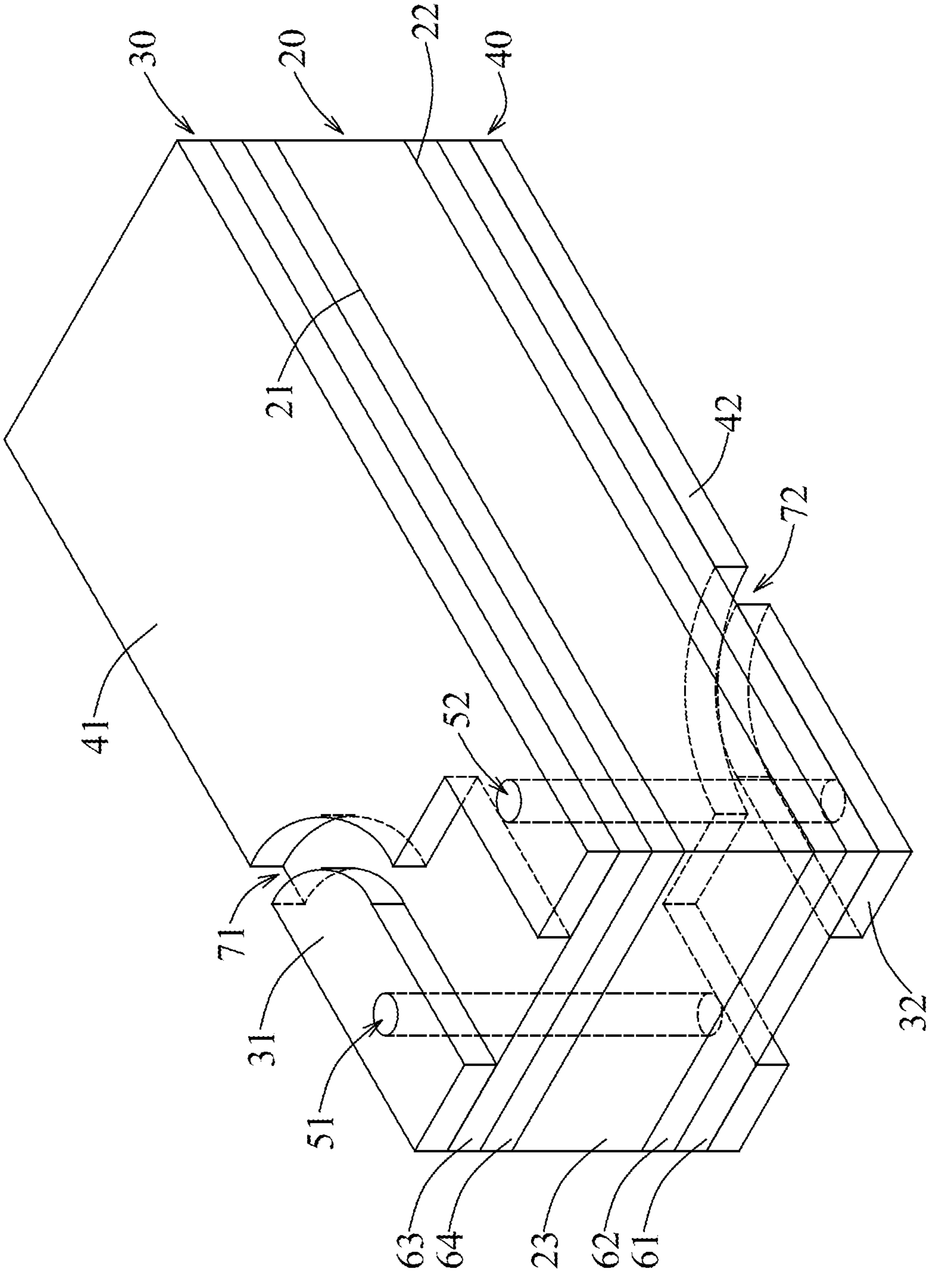
FIG. 4 is a perspective schematic view illustrating a third embodiment of the integrated over-current protection device according to the present disclosure.

Referring to FIG. 4, a third embodiment of the integrated over-current protection device according to the present disclosure is generally similar to the second embodiment, except that, in the third embodiment, the first conductive unit further includes a second insulating layer 63 and a fourth metal layer 64. The second insulating layer 63 is disposed between the PTC component 20 and the first metal layer 30, and is partially exposed from the first metal layer 30 through the first trench 71. The fourth metal layer 64 is disposed between the PTC component 20 and the second insulating layer 63. The second conductive vias 52 further extends through the second insulating layer 63 and the fourth metal layer 64. The fourth metal layer 64 may be made of a material which is same as or different from that of the first metal layer 30. The second insulating layer 63 may be made of a material which is same as or different from that of the first insulating layer 61.

Figure 5:
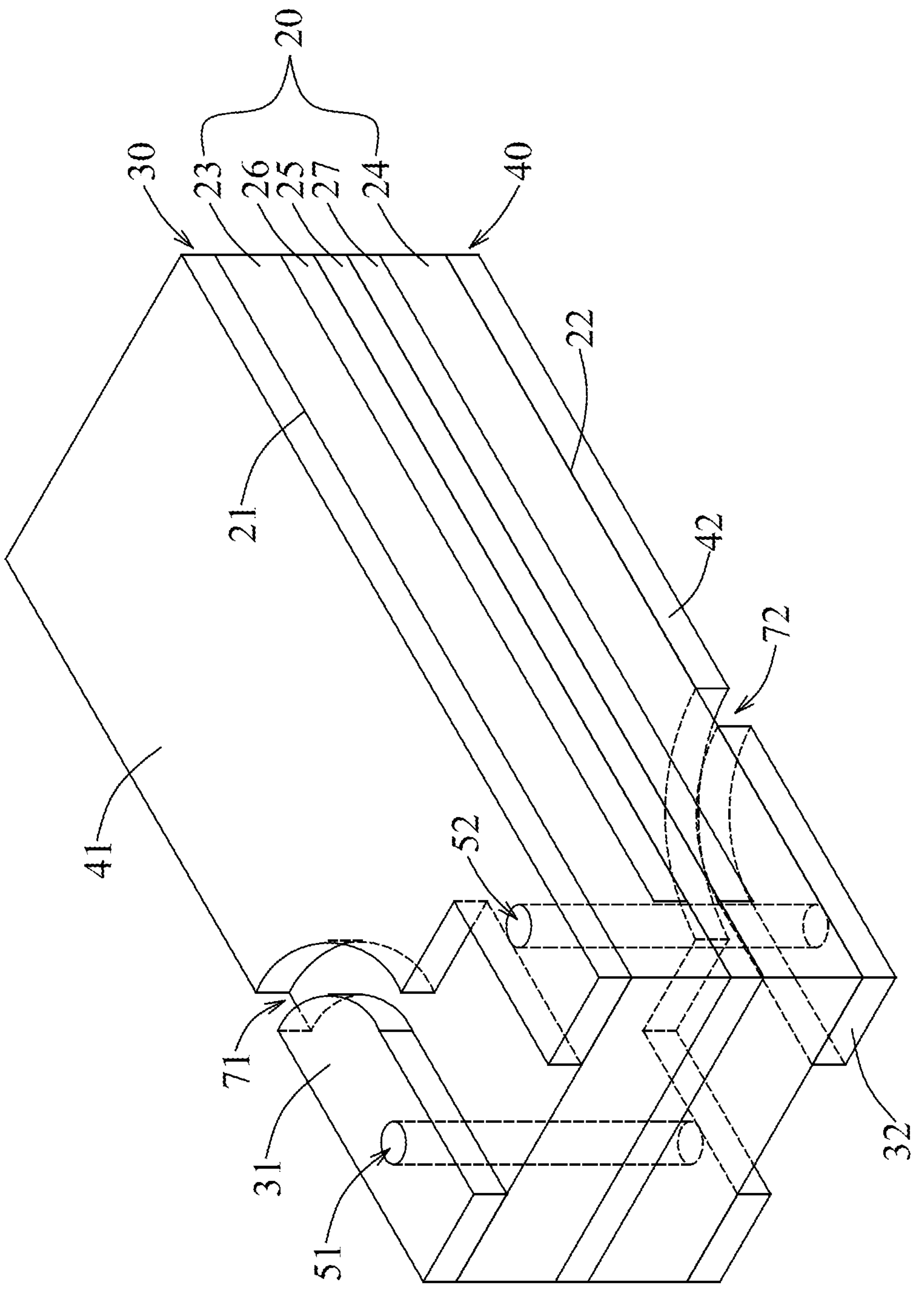
FIG. 5 is a perspective schematic view illustrating a fourth embodiment of the integrated over-current protection device according to the present disclosure.
Figure 6:
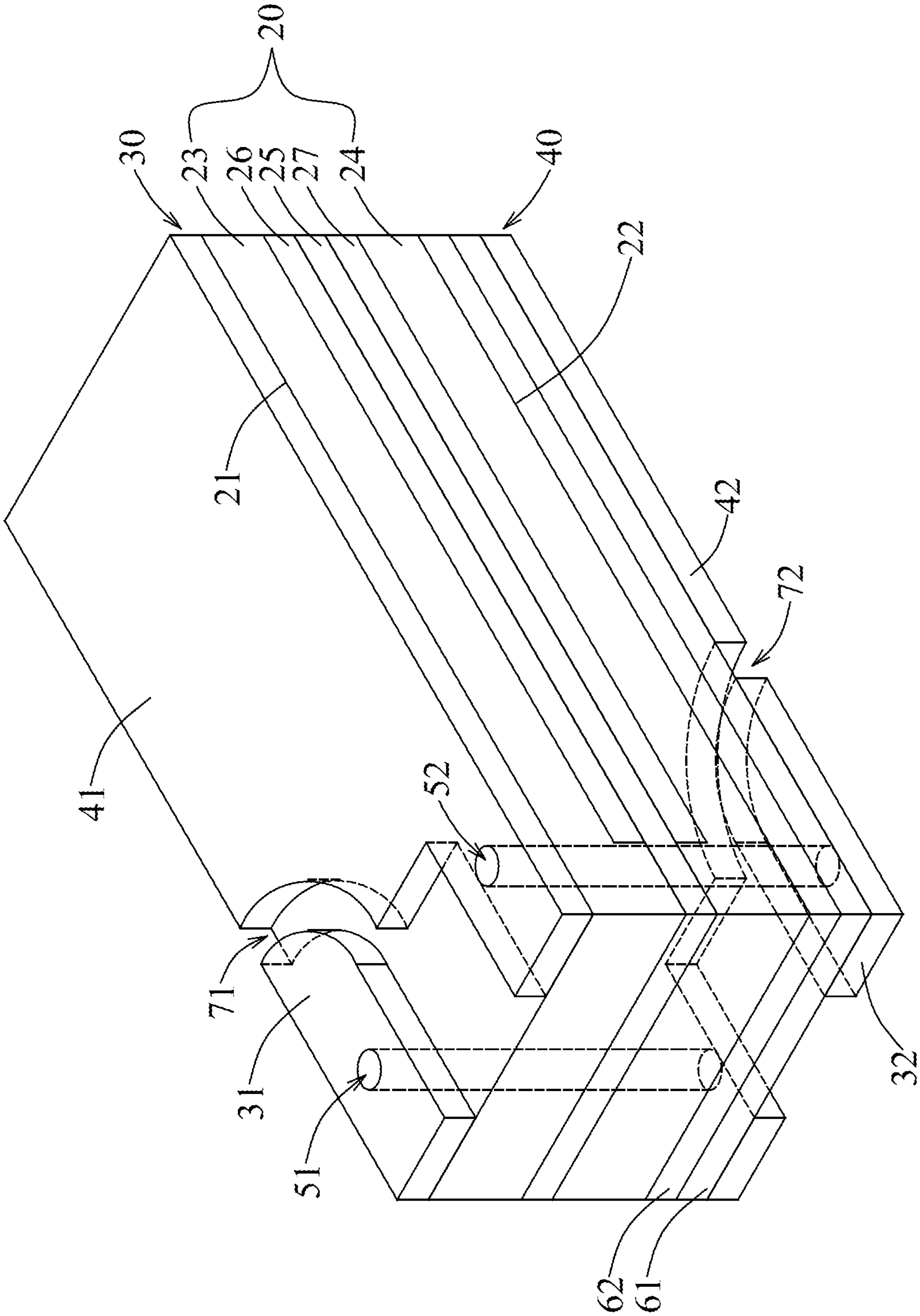
FIG. 6 is a perspective schematic view illustrating a fifth embodiment of the integrated over-current protection device according to the present disclosure.
Figure 7:
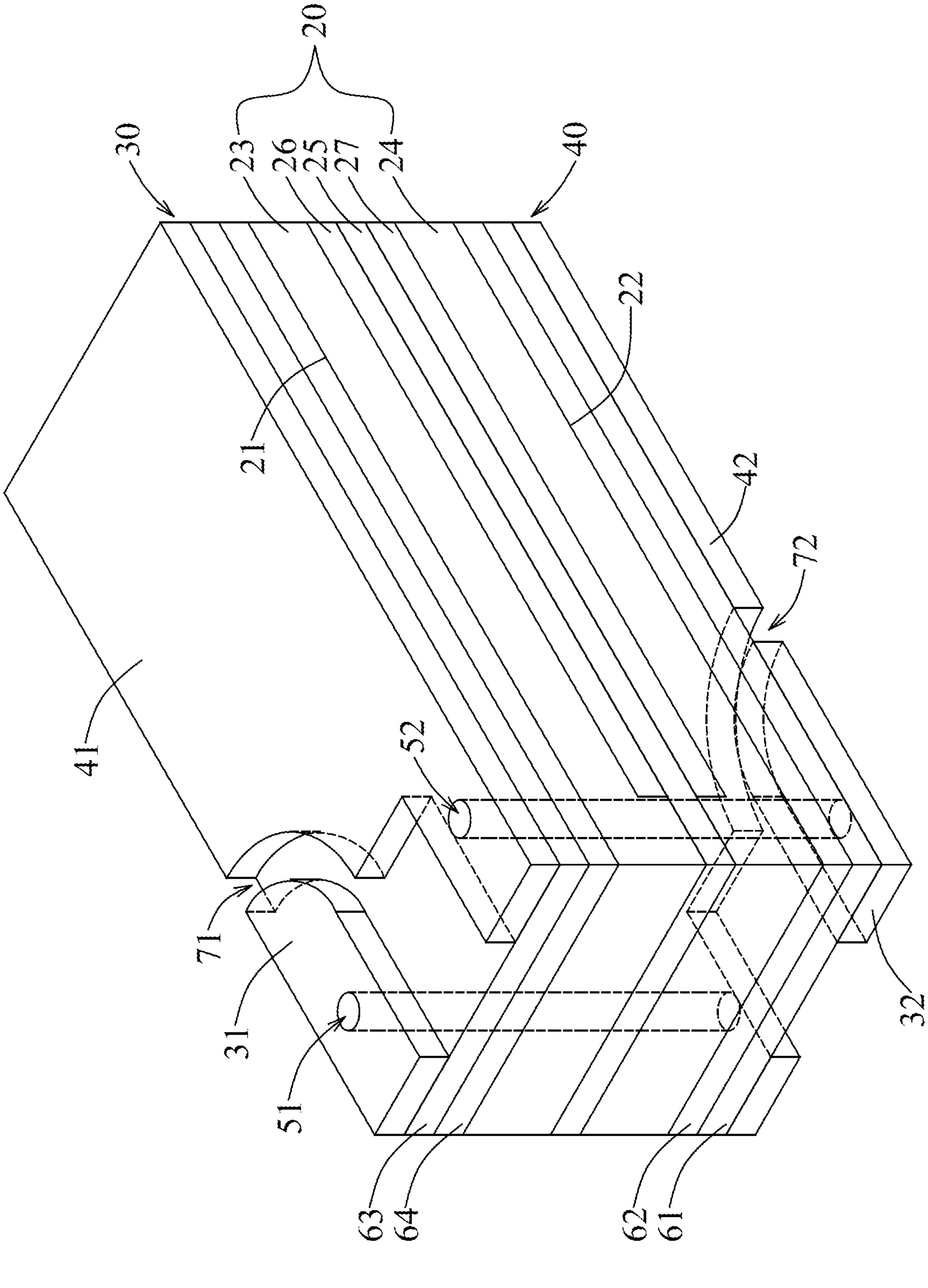
FIG. 7 is a perspective schematic view illustrating a sixth embodiment of the integrated over-current protection device according to the present disclosure.

Referring to FIGS. 5 to 7, a fourth embodiment, a fifth embodiment and a sixth embodiment of the integrated over-current protection devices according to the present disclosure are similar to the first, second and third embodiments, respectively, except that in each of the fourth, fifth and sixth embodiments, the PTC component 20 further includes a second PTC body 24, a PTC insulating layer 25, a first PTC metal layer 26, and a second PTC metal layer 27. The PTC insulating layer 25 is disposed between the first and second PTC bodies 23, 24. The first PTC metal layer 26 is disposed between the PTC insulating layer 25 and the first PTC body 23. The second PTC metal layer 27 is disposed between the PTC insulating layer 25 and the second PTC body 24.

Each of the conductive vias 51, 52 extends through the first and second PTC bodies 23, 24, the first and second PTC metal layers 26, 27, and the PTC insulating layer 25. The first and second PTC bodies 23, 24 are connected in parallel to each other through the conductive vias 51, 52 and the first and second PTC metal layers 26, 27. With such electrical connection between the first and second PTC bodies 23, 24, the integrated over-current protection device may exhibit a relatively low resistance.

The second PTC body 24 may be made of a material which is the same as or different from that of the first PTC body 23. Each of the first and second PTC metal layers 26, 27 may be independently made of a material which is the same as or different from the material of the first metal layer 30. The PTC insulating layer 25 may be made of an epoxy resin.

In yet other embodiments, each of the first and second conductive unit may include one or more additional metal layers and additional insulating layers, and the PTC component 20 may include one or more additional PTC bodies, additional PTC metal layers and additional PTC insulating layers according to practical needs.

Examples of the disclosure will be described hereinafter. It is to be understood that these examples are exemplary and explanatory and should not be construed as a limitation to the disclosure.

EXAMPLES

Example 1 (E1)

10.25 grams of high density polyethylene (HDPE, purchased from *Formosa* Plastics®, catalog no.: HDPE9002, and serving as a non-grafted olefin-based polymer), 10.25 grams of maleic anhydride grafted HDPE (purchased from Dupont®, catalog no.: MB100D, and serving as a carboxylic acid anhydride-grafted olefin-based polymer) and 29.5 grams of carbon black powder (purchased from Columbian Chemicals Co., catalog no.: Raven 430UB, and serving as a conductive filler) were compounded in a Brabender® mixer at 200° C. under 30 rpm for 10 minutes, so as to obtain a compounded mixture. The compounded mixture was hot pressed in a mold under 200° C. and 80 kg/cm$^2$ for 4 minutes so as to obtain a thin sheet of a first PTC layer with a thickness of 0.35 mm.

Two nickel-plated copper sheet (serving as the first and second metal layers) were respectively attached to two opposite surfaces of the first PTC layer, and then were hot pressed under 200° C. and 80 kg/cm$^2$ for 4 minutes so as to form a sandwiched structure of a PTC laminate having a thickness of 0.42 mm. The PTC laminate was cut into a plurality of PTC chips each having a size of 8.0 mm×14.7 mm. The PTC chips were irradiated with a Cobalt-60 gamma ray for a total irradiation dose of 150 kGy. Each of the irradiated PTC chips was subjected to a drilling process to form two through holes extending through the first and second metal layers and the first PTC layer, and then subjected to an electroplating process such that the two through holes were formed into a first conductive via and a second conductive via. Afterwards, for each of the PTC chips, a patterning treatment including an etching process and a cutting process, was performed on the first and second metal layers, so as to form a first trench and a second trench which respectively extend through the first and second metal layers and which expose the first PTC layer. The first metal layer was therefore formed into a first electrode and a first conductive pad electrically insulated from each other through the first trench, whereas the second metal layer was formed into a second electrode and a second conductive pad electrically insulated from each other through the second trench. The first electrode is electrically connected to the second conductive pad through the first conductive via, and the second electrode is electrically connected to the first conductive pad through the second conductive via. As such, an integrated over-current protection device of E1 having the structure shown in FIG. 2 was obtained.

Example 2 (E2)

The integrated over-current protection device of E2 has a structure as shown in FIG. 3, and was prepared by procedures and conditions generally similar to those of E1, except that, during formation of the PTC laminate having a thickness of 0.56 mm of E2, an epoxy resin (serving as a first insulating layer) with a thickness of 0.1 mm was further formed between the second metal layer and the first PTC layer, and an additional nickel-plated copper sheet (serving as the third metal layer) was formed between the first insulating layer and the first PTC layer. In addition, the second trench was formed to expose the first insulating layer, and each of the first and the second conductive vias further extends through the third metal layer and the first insulating layer.

Example 3 (E3)

The integrated over-current protection device of E3 has a structure as shown in FIG. 4, and was prepared by procedures and conditions generally similar to those of E2, except that, during formation of the PTC laminate having a thickness of 0.69 mm of E3, an additional epoxy resin (serving as a second insulating layer) was further formed between the first metal layer and the first PTC layer, and another additional nickel-plated copper sheet (serving as the fourth metal layer) was further formed between the second insulating layer and the first PTC layer. In addition, the first trench is formed to expose the second insulating layer, and each of the first and second conductive vias further extends through the fourth metal layer and the second insulating layer.

Examples 4 to 6 (E4 to E6)

The integrated over-current protection devices of E4 to E6 respectively have structures as shown in FIGS. 5 to 7, and were prepared by procedures and conditions generally similar to those of E1 to E3, except for the following differences. To be specific, during formation of the PCT laminates of E4 to E6 which respectively have a thickness of 0.94 mm, 1.08 mm, and 1.21 mm, a second PTC layer was prepared by a material the same as that of the first PTC layer. Another additional epoxy resin (serving as the PTC insulating layer) was formed between the first and second PTC layers, and two additional nickel-plated copper sheets (respectively serving as the first PTC metal layer and the second PTC metal layer) were formed between the first PTC layer and the PTC insulating layer, and between the second PTC layer and the PTC insulating layer. In addition, each of the first and second conductive vias further extends through the second PTC layer, the first and second PTC metal layers, and the PTC insulating layer.

Comparative Example 1 (CE1)

The integrated over-current protection device of CE1 has a structure as shown in FIG. 1, and was prepared by procedures and conditions similar to those of E1, except that, the drilling process and the patterning treatment were not performed on the PTC laminate. That is, the first and second conductive vias and the first and second trenches were omitted in CE1. In addition, a first metal lead was attached to be electrically connected the first metal layer, and a second metal lead was attached to be electrically connected the second metal layer.

Performance Test

Resistance Test

Ten integrated over-current protection devices of each of E1 to E6 and CE1, serving as test devices, were subjected to a resistance test conducted according to the Underwriters Laboratories® UL 1434 Standard for Safety for Thermistor-Type Devices using an ohmmeter, so as to determine the average initial resistance (Ri) of the test devices. The results are shown in Table 1.

TABLE 1

| | Electrical properties | | | | | |
|---|---|---|---|---|---|---|
| | Time to trip | Initial Resistance | Switching cycle test | | Aging test | |
| | (s) | (Ri, ohm) | $Rf_1$ (ohm) | $Rf_1/Ri \times 100\%$ | $Rf_2$ (ohm) | $Rf_2/Ri \times 100\%$ |
| E1 | 8.5 | 0.017 | 0.298 | 1753% | 0.108 | 635% |
| E2 | 8.2 | 0.016 | 0.275 | 1719% | 0.095 | 594% |
| E3 | 8.0 | 0.016 | 0.265 | 1656% | 0.080 | 500% |
| E4 | 9.6 | 0.009 | 0.125 | 1389% | 0.030 | 333% |

TABLE 1-continued

| | Time to trip | Initial Resistance | Electrical properties | | | |
|---|---|---|---|---|---|---|
| | | | Switching cycle test | | Aging test | |
| | (s) | (Ri, ohm) | $Rf_1$ (ohm) | $Rf_1/Ri \times 100\%$ | $Rf_2$ (ohm) | $Rf_2/Ri \times 100\%$ |
| E5 | 9.7 | 0.008 | 0.106 | 1325% | 0.024 | 300% |
| E6 | 9.8 | 0.008 | 0.105 | 1313% | 0.022 | 275% |
| CE1 | 11.5 | 0.021 | 0.488 | 2324% | 0.214 | 1019% |

As shown in Table 1, the test devices of E1 to E6 have an average initial resistance ranging from 0.008 ohm to 0.017 ohm, which are significantly lower than that of CE1.

Time-to-Trip Test

In order to determine the trip time of the test devices, ten test devices of each of E1 to E6 and CE1 were subjected to a time-to-trip test conducted according to the Underwriters Laboratories® UL 1434 Standard for Safety for Thermistor-Type Devices using a power supply (Manufacturer: Chyng Hong Electronic Co., Ltd., Model No: DSP-060-050HD). The trip time is measured as the time taken for each of the test devices to trip at a selected trip current of 13 A under a fixed voltage of 16 Vdc. The results are shown in Table 1.

As shown in Table 1, the test devices of E1 to E6 have an average trip time ranging from 8.0 s to 9.8 s, which are significantly less than that of CE1.

Switching Cycle Test

Ten test devices of each of E1 to E6 and CE1 were subjected to a switching cycle test conducted according to the Underwriters Laboratories® UL 1434 Standard for Safety for Thermistor-Type Devices using a power supply (Manufacturer: Chyng Hong Electronic Co., Ltd., Model No: DSP-060-050HD). The switching cycle test was conducted under a voltage of 16 Vdc and a current of 100 A by switching on each of test devices on for 60 seconds and then off for 60 seconds per cycle for 6000 cycles. The average resistances of the test devices after the switching cycle test ($Rf_1$) were measured. A percentage of variation of the average resistances of the test devices of each of E1 to E6 and CE1 after the switching cycle test was determined according to a formula of $Rf_1/Ri \times 100\%$, and the results are shown in Table 1.

As shown in Table 1, after the switching cycle test, the test devices of E1 to E6 have a percentage of variation of the average resistances ranging from 1313% to 1753%, which is significantly lower than that of CE1.

Aging Test

Ten test devices of each of E1 to E6 and CE1 were subjected to an aging test conducted according to the Underwriters Laboratories® UL 1434 Standard for Safety for Thermistor-Type Devices using a power supply (Manufacturer: Chyng Hong Electronic Co., Ltd., Model No: DSP-060-050HD). The aging test was conducted by applying a voltage of 16 Vdc and a current of 100 A to each of test devices for 1000 hours. The average resistances of the test devices after the aging test ($Rf_2$) were measured. A percentage of variation of the average resistances of the test devices of each of E1 to E6 and CE1 was determined according to a formula of $Rf_2/Ri \times 100\%$, and the results are shown in Table 1.

As shown in Table 1, after the aging test, the test devices of E1 to E6 have a percentage of variation of the average resistances ranging from 275% to 635%, which is significantly lower than that of CE1.

In conclusion, with the formation of the first and second conductive vias 51, 52 to electrically connect the first electrode 31 to the second conductive pad 42 and to electrically connect the second electrode 32 to the first conductive pad 41, respectively, the integrated over-current protection device of the present disclosure enables improved conduction, and exhibits good electrical properties and an improved reliability.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An integrated over-current protection device, comprising:

a positive temperature coefficient (PTC) component that includes a first PTC body and that has a first surface and a second surface opposite to said first surface;

a first conductive unit including a first metal layer which is disposed on said first surface, and which includes a first electrode and a first conductive pad electrically insulated from said first electrode;

a second conductive unit including a second metal layer which is disposed on said second surface, and which includes a second electrode and a second conductive pad electrically insulated from said second electrode;

a first conductive via that extends through said first conductive unit and said PTC component to electrically connect said first electrode to said second conductive pad; and a second conductive via that extends through said second conductive unit and said PTC component to electrically connect said second electrode to said first conductive pad, wherein:

said second conductive unit further includes:

a first insulating layer disposed between said PTC component and said second metal layer, and a third metal layer disposed between said PTC component and said first insulating layer; and said first conductive via further extends through said first insulating layer and said third metal layer.

2. The integrated over-current protection device of claim 1, wherein at least one of said first and second conductive vias is spaced apart from side walls of said integrated over-current protection device, said side walls interconnecting a top surface of said first metal layer opposite to said first surface and a bottom surface of said second metal layer opposite to said second surface.

3. The integrated over-current protection device of claim 1, wherein:

said first conductive unit further includes a second insulating layer disposed between said PTC component, and said first metal layer, and a fourth metal layer disposed between said PTC component and said second insulating layer; and said second conductive via further extends through said second insulating layer and said fourth metal layer.

4. An integrated over-current protection device, comprising:

a positive temperature coefficient (PTC) component that has a first surface and a second surface opposite to said first surface, and that includes:

a first PTC body;

a second PTC body;

a PTC insulating layer disposed between said first and second PTC bodies;

a first PTC metal layer disposed between said PTC insulating layer and said first PTC body;

a second PTC metal layer disposed between said PTC insulating layer and said second PTC body, a first conductive unit including a first metal layer which is disposed on said first surface, and which includes a first electrode and a first conductive pad electrically insulated from said first electrode;

a second conductive unit including a second metal layer which is disposed on said second surface, and which includes a second electrode and a second conductive pad electrically insulated from said second electrode;

a first conductive via that extends through said first conductive unit and said PTC component to electrically connect said first electrode to said second conductive pad; and a second conductive via that extends through said second conductive unit and said PTC component to electrically connect said second electrode to said first conductive pad.

5. The integrated over-current protection device of claim 4, wherein said first and second PTC bodies are connected in parallel to each other.

6. The integrated over-current protection device of claim 4, wherein:

said second conductive unit further includes a first insulating layer disposed between said PTC component and said second metal layer, and a third metal layer disposed between said PTC component and said first insulating layer; and said first conductive via further extends through said first insulating layer and said third metal layer.

7. The integrated over-current protection device of claim 6, wherein:

said first conductive unit further includes a second insulating layer disposed between said PTC component, and said first metal layer, and a fourth metal layer disposed between said PTC component and said second insulating layer; and said second conductive via further extends through said second insulating layer and said fourth metal layer.

8. The integrated over-current protection device of claim 1, wherein said first metal layer is formed with a first trench to expose the first surface and to electrically insulate said first electrode from said first conductive pad.

9. The integrated over-current protection device of claim 8, wherein said second metal layer is formed with a second trench to expose the second surface and to electrically insulate said second electrode from said second conductive pad.

10. The integrated over-current protection device of claim 1, wherein said first conductive via further penetrates into said second conductive unit.

11. The integrated over-current protection device of claim 1, wherein said second conductive via further penetrates into said first conductive unit.

12. The integrated over-current protection device of claim 4, wherein at least one of said first and second conductive vias is spaced apart from side walls of said integrated over-current protection device, said side walls interconnecting a top surface of said first metal layer opposite to said first surface and a bottom surface of said second metal layer opposite to said second surface.

13. The integrated over-current protection device of claim 4, wherein said first metal layer is formed with a first trench to expose the first surface and to electrically insulate said first electrode from said first conductive pad.

14. The integrated over-current protection device of claim 13, wherein said second metal layer is formed with a second trench to expose the second surface and to electrically insulate said second electrode from said second conductive pad.

15. The integrated over-current protection device of claim 4, wherein said first conductive via further penetrates into said second conductive unit.

16. The integrated over-current protection device of claim 4, wherein said second conductive via further penetrates into said first conductive unit.

* * * * *